United States Patent
Carnelli et al.

(10) Patent No.: US 8,535,487 B2
(45) Date of Patent: Sep. 17, 2013

(54) PROCESS FOR THE PURIFICATION OF AN AQUEOUS STREAM COMING FROM THE FISCHER-TROPSCH REACTION

(75) Inventors: Lino Carnelli, Carbonate (IT); Carla Lazzari, Cornaredo (IT); Gianni Pandolfi, Novara (IT)

(73) Assignee: ENI S.p.A., Rome (IT)

(*) Notice: Subject to any disclaimer, the term of this patent is extended or adjusted under 35 U.S.C. 154(b) by 707 days.

(21) Appl. No.: 12/664,747

(22) PCT Filed: May 30, 2008

(86) PCT No.: PCT/EP2008/004397
§ 371 (c)(1),
(2), (4) Date: Apr. 19, 2010

(87) PCT Pub. No.: WO2008/151742
PCT Pub. Date: Dec. 18, 2008

(65) Prior Publication Data
US 2010/0193346 A1    Aug. 5, 2010

(30) Foreign Application Priority Data
Jun. 15, 2007  (IT) ............... MI2007A1209

(51) Int. Cl.
*B01D 3/00*    (2006.01)
*C02F 1/04*    (2006.01)
*C02F 9/02*    (2006.01)

(52) U.S. Cl.
USPC ........... 203/14; 203/20; 203/23; 203/87; 203/DIG. 25; 210/774; 518/728

(58) Field of Classification Search
USPC ...... 203/2, 3, 14, 15, 18, 20, 23, 87, DIG. 25; 210/774; 518/728
See application file for complete search history.

(56) References Cited

U.S. PATENT DOCUMENTS

| 2,398,068 | A |   | 4/1946  | Worthen et al. |
|-----------|---|---|---------|----------------|
| 3,658,656 | A | * | 4/1972  | Adica et al. ............... 203/49 |
| 4,089,749 | A |   | 5/1978  | Karamian et al. |
| 4,134,740 | A |   | 1/1979  | Marion et al. |
| 4,347,321 | A | * | 8/1982  | Lionelle et al. ............. 435/161 |
| 4,390,398 | A | * | 6/1983  | Coker et al. ............... 203/18 |
| 5,262,013 | A | * | 11/1993 | Beal et al. ................ 203/18 |

(Continued)

FOREIGN PATENT DOCUMENTS

| EP | 0 838 435 | 4/1998 |
| WO | 2006 012295 | 2/2006 |
| WO | 2006 012296 | 2/2006 |

OTHER PUBLICATIONS

U.S. Appl. No. 12/863,101, filed Jul. 15, 2010, Carnelli, et al.

*Primary Examiner* — Virginia Manoharan
(74) *Attorney, Agent, or Firm* — Oblon, Spivak, McClelland, Maier & Neustadt, L.L.P.

(57) ABSTRACT

A process for purifying an aqueous stream from a Fischer-Tropsch reaction that includes feeding the aqueous stream to a system that includes a distillation column equipped with a partial condenser and a total condenser, at least partially condensing the vaporized stream leaving the head of the distillation column and collecting a first distillate in which in heavier by-products, totally condensing the remaining portion of the vaporized stream leaving the partial condenser and collecting a liquid stream which is returned to the distillation column as a reflux and removing a purified aqueous stream from the bottom of the distillation column.

13 Claims, 1 Drawing Sheet

(56) References Cited

U.S. PATENT DOCUMENTS

| | | |
|---|---|---|
| 6,193,872 B1 | 2/2001 | Reason et al. |
| 6,225,358 B1 * | 5/2001 | Kennedy ................ 518/700 |
| 6,887,908 B1 | 5/2005 | Pruet |
| 7,001,927 B2 * | 2/2006 | Zhang et al. ............ 518/700 |
| 7,902,407 B2 * | 3/2011 | Silva et al. ............. 568/716 |
| 7,989,510 B2 * | 8/2011 | Locatelli et al. ......... 518/700 |
| 2005/0284290 A1 | 12/2005 | Pruet |

* cited by examiner

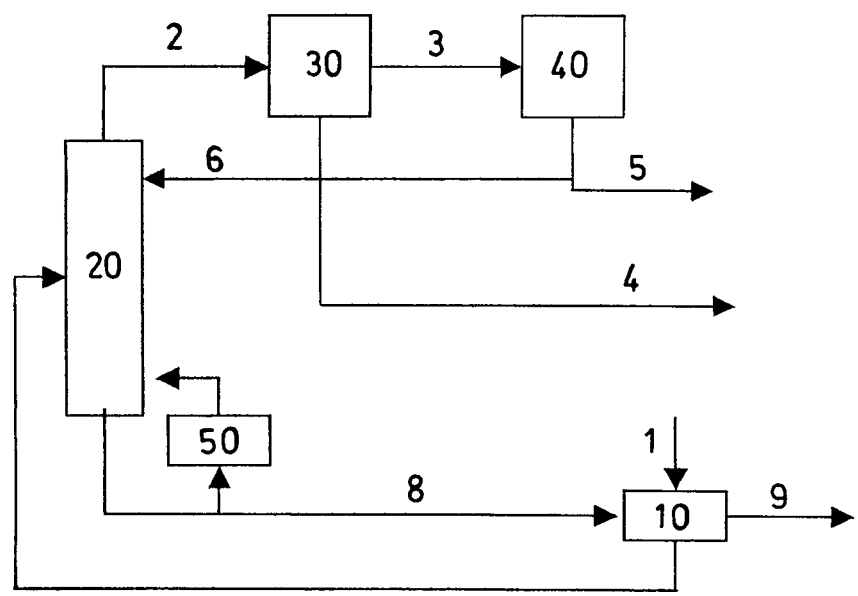

PROCESS FOR THE PURIFICATION OF AN AQUEOUS STREAM COMING FROM THE FISCHER-TROPSCH REACTION

The present application is a national stage application of PCT/EP08/004397 having a filing date of May 30, 2008 and claiming priority to Italian patent application MI2007A001209 having a filing date of Jun. 15, 2007.

The present invention relates to a process for the purification of an aqueous stream coming from the Fischer-Tropsch reaction.

More specifically, the invention relates to a process for the purification of the aqueous stream coming from the Fischer-Tropsch reaction which is based on a treatment in a distillation column and a subsequent partial condensation operation of the vapour leaving the distillation column followed by total condensation.

The process for the production of liquid hydrocarbons with the Fischer-Tropsch reaction generates a quantity, by weight, of water which is greater than the total quantity of hydrocarbons produced, following the production of a mole of water for every mole of CO converted into hydrocarbons.

Two phases are substantially produced by the reaction: a lighter, vapour phase, essentially consisting of a mixture of hydrocarbons, with a number of carbon atoms ranging from 1 to 25 and a boiling point at atmospheric pressure, for the $C_5$-$C_{25}$ fraction, equal to or lower than 150° C. and reaction by-products, such as water vapour, ethers or alcohols.

This stream, together with the non-reacted reaction gas, is cooled to condense and separate the hydrocarbons from the water generated by the reaction and from the other by-products.

The operation is effected in common phase separators for liquids, after which there can be traces of organic phase dispersed in the water. They can cause the formation of foam in the applications downstream and consequently a complete elimination of the dispersed organic products is effected with the help of coalescence filters (US 2004/0262199 A1 Sasol).

Meteoric water or other service water present in the production site can be added to the process water.

The aqueous stream obtained however contains various polluting substances, also corrosive, due to the solubility of the organic compounds in water and it cannot be totally discharged and/or reused in the process without further purification.

The pollutants can consist of alcohols, acids, ketones, aldehydes and hydrocarbons in varying quantities: the concentration of alcohols can vary from 0.5 to 5% by weight, that of acids from 0.05 to 1.5%, the hydrocarbons from 0.001 to 0.1%.

The quantity of compounds present, within each group, decreases with an increase in the molecular weight and compounds are counted with up to 25 carbon atoms.

The treatment systems of this water normally comprise vaporization operations of part of the water, effected by means of additional gaseous streams such as natural gas, water vapour or air in stripping columns (1991/U.S. Pat. No. 5,004,862 Exxon), or effected inside distillation equipment equipped with a reboiler (2001/U.S. Pat. No. 6,225,358 B1 Syntroleum, US 2004/0262199 A1 Sasol) and equipped with or without reflux.

Systems are also used which envisage the combination of the two methods (2001/U.S. Pat. No. 6,225,358 B1 Syntroleum). In this way a stream rich in non-acid organic compounds is obtained, still containing a considerable quantity of water and a stream of water in which more or less only acids and possible salts or suspended solids not previously eliminated, remain.

Another possible water treatment consists in a treatment with activated carbons or other adsorbing solids, such as clays or zeolites, for the elimination of the organic products contained in the water, possibly preceded by a distillation which concentrates alcohols, aldehydes, hydrocarbons and ketones in the distillate, as described in the 2002/U.S. Pat. No. 6,462,097 B1 IFP-Agip Petroli-ENI.

The stripping and distillation operations are based on the fact that alcohols, hydrocarbons, ketones and aldehydes, when present in small quantities in water, have a considerably non-ideal behaviour, they are more volatile than the water itself and are concentrated at the head of the stripping and distillation equipment; in this way they are separated from the main aqueous stream in which substantially only the organic acids remain.

Patent US 2004/0262199 A1 Sasol, which envisages the use of a distillation column, points out that once non-acid compounds with a longer chain have been concentrated together with lighter compounds, they lose most of their non-ideality and therefore tend to be less volatile.

In this way, it may happen that they are pushed upwards in the low part of the column and pushed downwards in the upper part without find an outlet.

The solution proposed by US patent 2004/0262199 A1 Sasol consists in inserting a side collection in liquid phase between the feeding and the highest plate of the column, with demixing, resending of the aqueous phase to the same column and collection of the organic phase. This operation envisages a consistent structural modification of the column and operating procedure also for problems relating to the possible formation of emulsions which are difficult to demix.

Another way of eliminating the heavier compounds consists in removing a flow in vapour phase from a plate situated near the reboiler, condensing it, separating the aqueous phase from the organic phase and recycling the aqueous phase in the feeding.

An additional objective of the purification systems of the water coming from the Fischer-Tropsch process consists in reducing the water content in the stream which is enriched in heavy non-acid organic by-products to allow better combustion and/or upgrading of the chemical compounds present.

A method has now been found, which, through a simple partial condensation operation of the vapour leaving the distillation column, followed by a total condensation, allows the heavy non-acid organic compounds to be significantly separated from the water fed to the column, at the same time, minimizing the water content present in the distillate. A stream enriched in heavy organic compounds is thus obtained together with a purified stream which contains only traces without resorting to the introduction of a side collection.

In accordance with this, an object of the present invention relates to a process for the purification of an aqueous stream coming from the Fischer-Tropsch reaction which comprises:

feeding of the aqueous stream containing the organic by-products of the reaction to a system consisting of a distillation column equipped with a partial condenser and a total condenser;

partial condensation of the vaporized stream leaving the head of the column and the collection of a first distillate enriched in the heavier by-products:

total condensation of the vaporized stream leaving the partial condenser and collection of a liquid stream which is partly sent back to the distillation column as reflux, whereas the remaining part is collected as distillate;

extraction of the purified aqueous stream from the bottom of the distillation column.

More specifically, the process of the present invention comprises, in accordance with the scheme shown in FIG. 1:
(a) feeding the aqueous stream (1) containing the organic by-products of the Fischer-Tropsch reaction in a quantity ranging from 0.5 to 7% by weight, to a system consisting of a distillation column (20), equipped with a partial condenser (30) and a total condenser (40);
(b) vaporizing a part, ranging from 5 to 40% by weight of the feeding stream, inside the column (20);
(c) collecting a vaporized stream from the head of the column (20) in a quantity ranging from 5 to 40% by weight of the stream fed (1), containing the by-products of the Fischer-Tropsch reaction at a concentration ranging from 20 to 80% by weight, and the minimum quantity of water obtain-able in relation to the composition of the feeding and operating conditions;
(d) condensing a quantity ranging from 0.5 to 15% by weight of the vaporized stream (2) leaving the head of the column in the condenser (30), so as to obtain a liquid stream (4) which is removed as distillate containing water at a concentration varying from 10 to 50% by weight and heavy organic by-products at a concentration ranging from 30 to 60% by weight;
(e) completely condensing the vaporized stream (3) leaving the condenser (30) in a second condenser (40) so as to obtain a liquid stream containing by-products with a lower molecular weight and water at a concentration ranging from 20% to 50% by weight;
(f) sending the stream (6) corresponding to 75-98% by weight of the liquid stream leaving the condenser (40) back to the column (20) as reflux and collecting the stream (5), corresponding to 2 to 25% by weight of the stream leaving the condenser, as distillate;
(g) extracting a purified aqueous stream (8) from the bottom of the column, containing a residual quantity of non-acid organic compounds lower than 1,000 ppm.

The stream which is fed to the distillation column consists of the aqueous phase coming from the Fischer-Tropsch reaction after being separated from the gaseous and liquid phases rich in hydrocarbons with one or more phase separators.

Before entering the column, the stream fed can be partially vaporized also to recover heat from another stream present in the plant.

The concentration of the organic compounds in the feeding stream generally ranges from 0.5 to 7%. In particular, this stream has a composition which varies within the following value ranges:

| Water | 93-99.5 w % |
|---|---|
| Alcohols | 0.5-5 w % |
| Acids | 0.05-1.5 w % |
| Hydrocarbons | 10-1,000 ppm |
| Metals | <10 ppm |
| COD | 10,000-140,000 mg/l |

The complete elimination of the organic compounds dispersed in the aqueous phase which could cause the formation of foam in the equipment downstream, can possibly be maximized with the use of coalescence filters.

The formation of foam can also be avoided with the addition of a suitable antifoam agent, selected for example from those commercially known (anionic, silicon surface-active agents, polyethyleneglycols, etc.).

The stream fed is partially vaporized inside the distillation column.

The distillation column consists of theoretical rectification steps situated above the feeding and theoretical exhaustion steps, situated below the feeding, the theoretical steps can be produced with plates or fillings of the structured and non-structured type.

The vaporization can be effected with a reboiler, the direct injection of vapour or a stripping gas, or through heat exchange with another stream present in the plant.

A vaporized stream containing the minimum quantity of water obtainable in relation to the composition of the feeding and operating conditions, leaves the head of the column.

A quantity ranging from 0.5 to 15% and preferably from 1 to 5% by weight of the vaporized stream (2) leaving the head of the column in the condenser (30) is condensed and the resulting liquid phase (4), with respect to the vapour phase leaving the column, is richer in heavy alcohols (heavy products) and poorer in light alcohols (light products) and water.

The water concentrations in this stream can typically range from 10 to 50% and preferably from 18 to 35%, the concentrations of the organic by-products from 30 to 60% and more specifically from 38 to 55%.

The first condensate is totally collected. The remaining vapour phase is completely condensed in a second condenser so as to obtain a liquid stream containing from 20 to 50% and more specifically from 30 to 40% of water, part of this, from 75 to 98%, typically from 85 to 95%, is sent back to the column as reflux and the remaining part collected as distillate.

In this way, with respect to a column with only one total condenser, an overall distillate can be obtained, in which the quantity of water is reduced by an amount ranging from 5 to 10% by weight, and in which the by-products, such as alcohols, aldehydes, ketones and hydrocarbons, are concentrated, and an aqueous phase at the bottom, containing a residual quantity of non-acid organic by-products lower than 1,000 ppm and in particular also lower than 100 ppm by weight.

The by-products contained in the two condensates can be upgraded as fuel, with advantages due to the overall reduction in the water content, recycled to the production of synthesis gas to maximize the overall yield to carbon of the process, or sent for further purification to upgrade the compounds present as chemical products.

If the content of residual acids allows the law limits to be respected, the water leaving the bottom of the column can be discharged as surface water, otherwise it can be further purified with known methods (biological treatment, adsorption on carbons and other solid supports . . . ).

In an embodiment of the invention (FIG. 1), the feeding 1, to which the antifoam agent has been added, is preheated in the exchanger (10) recovering heat from the current leaving the bottom of the column, alternatively it can be preheated with another heat source available in the plant.

It is then fed to the distillation column 20 consisting of a number of theoretical rectification steps situated above the feeding greater than 2, typically from 3 to 15 and a number of theoretical exhaustion steps, situated below the feeding greater than 5, typically from 6 to 30 and more specifically from 8 to 14.

The necessary theoretical steps can be effected with plates for distillation columns or fillings of the structured or non-structured type.

A stream in vapour phase (2) containing a quantity of water in relation to the quantity of organic products present in the feeding and operating conditions of the column (20), leaves the head of the distillation column. The acid compounds mainly remain in the stream (8) leaving the bottom of the column with a small fraction of alcohols and non-volatile hydrocarbons.

The vapour (2) is partially condensed in the condenser (30). The resulting liquid phase (4) is enriched, also with respect to the vapour phase (2), in organic compounds with a higher molecular weight, which are thus separated.

The vapour phase (3) leaving the partial condenser is totally condensed in the condenser (40) and is partly collected with the stream (5) and partly used as reflux in the distillation column, stream (6).

The vapour phase present in the column can also be partly generated in the preheating exchanger (10) of the feeding, in the reboiler (50) or it can be generated by an external feeding of water vapour or other gas.

The water purified of all the non-acid organic compounds leaves the bottom of the column with the stream (8) and can be cooled in the exchanger (10) for the subsequent uses, stream (9).

The operating pressure of the column is preferably atmospheric pressure, the column is capable of functioning equally well at higher or lower pressures such as, for example, within the range of 0.5-3 atm, the operating limits are essentially determined by the availability of heat sources for the heating of the reboiler and cooling of the condensers.

The temperatures are determined by the pressure and composition of the mixtures; at operating pressures within the range of 0.5-3 atm, the temperature at the head of the column is maintained within the range of 60-120° C., that at the bottom within the range of 75-130° C., whereas the temperature of the first condenser ranges from 55 to 110° C. in relation to the desired condensation degree and pressure.

It is preferable to operate at atmospheric pressure, the temperature at the head of the column is maintained within the range of 80-98° C., that at the bottom within the range of 95-105° C., whereas the temperature of the first condenser ranges from 75 to 90° C.

EXAMPLE 1

As an example, 100 kg/h of a mixture having the following composition are fed into a column with 7 theoretical rectification steps and 12 theoretical exhaustion steps:

| Compound | weight percentage |
|---|---|
| Water | 98.67 |
| Methanol | 0.2500 |
| Ethanol | 0.2400 |
| Propanol | 0.2300 |
| Butanol | 0.1700 |
| Pentanol | 0.1000 |
| Hexanol | 0.0500 |
| Heptanol | 0.0200 |
| C8+ alcohols | 0.012 |
| Acetone | 0.0050 |
| Acetic acid | 0.1000 |
| Propanoic acid | 0.0691 |
| Butanoic acid | 0.0344 |
| Pentanoic acid | 0.0099 |
| Hexanoic acid | 0.0024 |
| Hydrocarbons | 0.0400 |

2 ppm of polypropyleneglycol antifoam agent having an average molecular weight of 2,000 are added to the feeding.

The column and condensation system are managed so as to have a vapour flow-rate leaving the column head of 22.8 kg/h, a flow-rate of the first condensate of 0.23 kg/h and a flow-rate of the second condensate of 22.56 kg/h, from which 21.14 kg/h are collected as reflux and 1.42 kg/h as distillate.

The equipment is maintained at 1 absolute bar with a temperature at the head of 87° C. and at the bottom of 99.8° C.

The water has a concentration of 34% in the vapour at the head and a concentration of 18.9% in the first condensate. The $C_{4+}$ alcohols are present in a concentration of 53.2% in the first concentrate and 12.13% in the second condensate, the $C_1$-$C_3$ alcohols have concentrations of 24.7 and 46.45% respectively in the first condensate and second condensate.

The average concentration of the water in the two collections is 32% by weight.

The acids have a concentration of 2.71% in the first condensate and 0.23% in the second condensate.

In the stream at the bottom, the water has a concentration of 99.79%, the residual alcohols amount to 40 ppm, the acids to 0.22%. The overall quantity of acids in the purified water is reduced by 10% approximately with respect to the feeding.

In this way, a stream rich in heavy alcohols, a stream rich in light alcohols and a stream of purified water are obtained.

The invention claimed is:

1. A process for the purification of an aqueous reaction stream coming from a Fischer-Tropsch reaction which comprises
   (a) feeding the aqueous reaction stream containing one or more organic by-products of the Fischer-Tropsch reaction in a quantity ranging from 0.5 to 7% by weight, to a system consisting of a distillation column, equipped with a partial condenser and a total condenser;
   (b) vaporizing a part, ranging from 5 to 40% by weight of the aqueous reaction stream inside the distillation column;
   (c) collecting the vaporized stream from the head of the distillation column in a quantity ranging from 5 to 40% by weight of the aqueous reaction stream, containing the by-products of the Fischer-Tropsch reaction at a concentration ranging from 20 to 80% by weight, and a minimum quantity of water obtainable in relation to the composition of the feeding and operating conditions;
   (d) condensing a quantity ranging from 0.5 to 15% by weight of the vaporized stream leaving the head of the distillation column in the partial condenser and collecting a first distillate containing water at a concentration varying from 10 to 50% by weight and one or more heavy organic by-products of the organic by-products at a concentration ranging from 30 to 60% by weight; then
   (e) completely condensing the remainder of the vaporized stream leaving the partial condenser in the total condenser so as to obtain a first liquid stream containing one or more low molecular weight by-products of the organic by-products and water at a concentration ranging from 20% to 50% by weight;
   (f) sending a portion of the first liquid stream corresponding to 75-98% by weight of the first liquid stream leaving the total condenser back to the distillation column as reflux and collecting a remainder of the first liquid stream, corresponding to 2 to 25% by weight of the first liquid stream leaving the total condenser, as a second distillate;
   (g) removing a purified aqueous stream from the bottom of the distillation column, containing a residual quantity of one or more non-acid organic compounds lower than 1,000 ppm.

2. The process according to claim 1, wherein the aqueous reaction stream has the following weight composition:

| | |
|---|---|
| Water | 93-99.5 w% |
| Alcohols | 0.5-5 w% |
| Acids | 0.05-1.5 w% |
| Hydrocarbons | 10-1,000 ppm |
| Metals | <10 ppm |
| COD | 10,000-140,000 mg/l. |

3. The process according to claim 1, wherein in (d) a quantity ranging from 1 to 5% by weight of the vaporized stream leaving the head of the distillation column in the partial condenser, is condensed.

4. The process according to claim 1, wherein in (d) the first distillate contains water at a concentration ranging from 18 to 35% by weight and heavy organic by-products at a concentration ranging from 38 to 55% by weight.

5. The process according to claim 1, wherein in (e) the first liquid stream collected from the total condenser contains one or more by-products with a lower molecular weight and water at a concentration ranging from 30 to 40% by weight.

6. The process according to claim 1, wherein in (f) the portion of the liquid stream corresponds to 85-95% by weight of the first liquid stream coming from the total condenser and the remainder of the first liquid stream corresponds to 5-15% of the first liquid stream.

7. The process according to claim 1, wherein in (g) the purified aqueous stream removed from the bottom of the distillation column contains a residual quantity of non-acid organic compounds lower than 100 ppm by weight.

8. The process according to claim 1, wherein the distillation column consists of a number of theoretical rectification steps, situated above a feeding point, greater than 2, and a number of theoretical exhaustion steps, situated below the feeding point, greater than 5.

9. The process according to claim 8, wherein the theoretical rectification steps range from 3 to 15 and the theoretical exhaustion steps range from 6 to 30.

10. The process according to claim 1, wherein the operating pressure of the distillation column ranges from 0.5-3 atm, the temperature at the head of the distillation column is maintained within the range of 60-120° C., the temperature at the bottom of the distillation column is within the range of 75-130° C., whereas the temperature of the partial condenser ranges from 55 to 110° C. in relation to the desired condensation degree and the pressure.

11. The process according to claim 10, wherein the operating pressure of the distillation column is atmospheric pressure, the temperature at the head of the distillation column is maintained within the range of 80-98° C., the temperature at the bottom of the distillation column is within the range of 95-105° C., whereas the temperature of the partial condenser ranges from 75 to 90° C.

12. The process according to claim 1, wherein the aqueous reaction stream is preheated with the purified aqueous stream leaving the bottom of the distillation column or with another heat source available in the plant.

13. The process according to claim 1, further comprising: adding an antifoam agent to the aqueous reaction stream.

* * * * *